2,872,283

PREPARATION OF POLYMERIC PHOSPHONITRILIC CHLORIDE

Maurice C. Taylor, Niagara Falls, N. Y.

No Drawing. Application January 13, 1956
Serial No. 558,855

3 Claims. (Cl. 23—14)

The present invention relates to the production of a polymeric form of phosphonitrilic chloride in high yield.

When phosphorus nitride is treated with chlorine, a direct union occurs with the production of phosphonitrilic chloride as represented by Equation 1:

(1) $$PN + Cl_2 \rightarrow PNCl_2$$

Phosphonitrilic chloride can also be produced by the reaction of phosphorus pentachloride and ammonium chloride, which reaction proceeds by mere heating of the reactants alone or in the presence of suitable inert organic solvents as represented by Equation 2:

(2) $$PCl_5 + (NH_4)Cl \rightarrow PNCl_2 + 4HCl$$

However, in carrying out the prior known reactions for production of phosphonitrilic chloride mixtures of polymeric forms of this product are formed during heating of the reaction mixture and reaction product.

The lower polymers, such as the trimer and tetramer, are solids with melting points of 114° C. and 123.5° C., respectively. The pentamer, hexamer and heptamer have been described but they are difficult to distill out of reaction mixtures because of their tendency to polymerize to still higher molecular weight bodies. These prior procedures produce around 20% yield of trimer and a 15% yield of tetramer, the remaining 65% being highly viscous, rubbery products.

The lower polymeric forms of phosphonitrilic chloride are of importance as intermediates in the production of chloro-imidometaphosphates produced by reaction with inorganic or organic hypochlorites, as described in U. S. Letters Patents 2,796,321 and 2,796,322 granted to Maurice C. Taylor on June 18, 1957.

In accordance with the present invention, the lower polymers, such as the tetramer of phosphonitrile chloride, may be prepared in yields of 90% or better by heating the mixed polymeric forms normally produced heretofore by the known reactions; that is, (a) the chlorination of phosphorus nitride or (b) by the reaction of ammonium chloride with phosphorus pentachloride, under controlled pressure conditions.

Thus, by the instant process, a system of higher polymeric forms of phosphonitrilic chloride is deliberately formed, then heated to a temperature above about 300° C. at a pressure of 5 to 30 millimeters of mercury. Under these conditions, the polymeric forms higher than the tetramer depolymerize and produce lower polymers, which polymers may be progressively distilled from the system of higher polymers.

At lower temperatures, for instance temperatures in the neighborhood of 200° C. and at pressures of from about ¾ to 2 atmospheres, phosphonitrilic chloride polymerizes to form an elastic, solid mass of higher polymers. The processes of the present invention employ the above conditions of polymerization and depolymerization to perform a cyclic operation wherein phosphonitrilic chlorides are first deliberately polymerized to the high polymer form wherein a solid, elastic mass is first produced. The conditions upon the system are subsequently changed to those at which depolymerization occurs. There is then formed a system from which specified lower polymeric forms, namely the trimeric and tetrameric forms, may be distilled off and the trimer and residue added to an additional batch of formed phosphonitrilic chloride, the cycle being repeated to produce an efficient operation with the production of up to 90% yield of tetramer.

In the cyclic operation, therefore, phosphonitrilic chloride is caused to polymerize by heating the same under a pressure exceeding the vapor pressure of the trimer at that temperature, until the whole mass sets to a mass of solid, higher polymers. This mass of polymerized phosphonitrilic chloride is then depolymerized by heating to a temperature above 300° C. under a pressure less than the vapor pressure of the lower molecular weight polymers being formed.

As a specific example of the cyclic operation of the present invention for the production of tetraphosphonitrilic chloride $(PNCl_2)_4$, 1900 grams of phosphorus pentachloride and 636 grams of ammonium chloride were suspended in 3 liters of tetrachloroethane and heated at 135° C. to 140° C. until the reaction was completed. The excess of unreacted ammonium chloride was then filtered off and 1090 grams of crude phosphonitrilic chloride remained as residue after the organic solvent had been removed by vacuum distillation.

To 1000 grams of the phosphonitrilic chloride prepared as above described, there was added from a previous run, 1080 grams of still residue (mixed higher polymers) and 974 grams of triphosphonitrilic chloride. This reaction mass was heated in a reaction vessel open to the atmosphere until the temperature of the mass was 220° C. to 230° C. The temperature was maintained at this level and the whole reaction mass polymerized to an elastic solid at the end of 1½ hours.

The reaction vessel was then connected to a condenser and receiver and the pressure of the system reduced to 10 millimeters of mercury. The reaction vessel was heated and the temperature raised gradually and at about 350° C., the elastic, solid mass began to depolymerize and the depolymerized product distilled. Heating was continued until the interior temperature was 500° C. and substantially all of the elastic, solid mass heated distilled over. 2950 grams of distillate were obtained.

The distillatae was then fractionated at a pressure of 5 to 20 millimeters of mercury. The first cut comprised matter distilling at a temperature below 150° C. This cut consisted of 975 grams of trimer, 893 grams of tetramer came over thereafter at a temperature up to 210° C., while 1080 grams of liquid still residue remained.

To the trimer and still residue, as obtained above, there was then added an additional amount (1000 grams) of phosphonitrilic chloride prepared as above described, which mixture was deliberately polymerized as described above, and thereafter the polymerized solid, elastic mass was depolymerized to produce trimer and tetramer in the manner indicated. Based on phosphonitrilic chloride, there was obtained a yield of 89.3% of tetramer; the original phosphonitrilic chloride being initially produced in substantially 100% yield.

The cyclic process described above is suitable for making any of the distillable polymers. Thus, should it be desired to obtain the trimer, the distillable product obtained below 150° is isolated, and to the still residue one would add phosphonitrilic chloride, deliberately polymerize and then subsequently depolymerize as outlined above.

The boiling points of the trimer, tetramer, pentamer and hexamer and heptamer are given below:

| | Boiling point |
|---|---|
| Trimer | 124° C. at 10 mm. |
| Tetramer | 185° C. at 10 mm. |
| Pentamer | 223–4° C. at 13 mm. |
| Hexamer | 261–3° C. at 13 mm. |
| Heptamer | 289–94° C. at 13 mm. |

What is claimed:

1. A process for the manufacture of phosphonitrilic chloride polymerized to a moderate degree which comprises heating a mixture of polymers of phosphonitrilic chloride above 200° C. at a pressure in excess of the vapor pressure of the trimer of phosphonitrilic chloride at the temperature of operation until a highly polymerized product is produced, thereafter heating the highly polymerized product at a temperature above 300° C. and at a pressure less than the vapor pressure at the temperature of this operation of the lower molecular weight polymers being formed until the highly polymerized product is depolymerized and then fractionating the depolymerized product by distillation and separating the desired polymers polymerized to a moderate degree, mixing the undesired lower polymers and the still residue for a repetition of polymerization, depolymerization and fractionation distillation as described.

2. A proces for the manufacture of phosphonitrilic chloride polymerized to a moderate degree which comprises heating a mixture of polymers of phosphonitrilic chloride above 200° C. at a pressure in excess of the vapor pressure of the trimer of phosphonitrilic chloride at the temperature of operation until a highly polymerized product is produced, thereafter heating the highly polymerized product at a temperature above 300° C. and at a pressure less than the vapor pressure at the temperature of this operation of the lower molecular weight polymers being formed until the highly polymerized product is depolymerized and then fractionating the depolymerized product by distillation and separating the trimer fraction, mixing the undesired lower polymers and the still residue for a repetition of polymerization, depolymerization and fractionation distillation as described.

3. A process for the manufacture of phosphonitrilic chloride polymerized to a moderate degree which comprises heating a mixture of polymers of phosphonitrilic chloride above 200° C. at a pressure in excess of the vapor pressure of the trimer of phosphonitrilic chloride at the temperature of operation until a highly polymerized product is produced, thereafter heating the highly polymerized product at a temperature above 300° C. and at a pressure less than the vapor pressure at the temperature of this operation of the lower molecular weight polymers being formed until the highly polymerized product is depolymerized and then fractionating the depolymerized product by distillation and separating the tetramer fraction, mixing the undesired lower polymers and the still residue for a repetition of polymerization, depolymerization and fractionation distillation as described.

References Cited in the file of this patent

Systematic Inorganic Chemistry, Yost and Russell, N. Y., Prentice-Hall, Inc. 1944, pp. 108–9.

Comprehensive Treatise on Inorganic and Theoretical Chemistry, Mellor; Longmans, Green and Co., 1928, vol. 8, pp. 721–2.